US011392219B2

(12) United States Patent
Thomas, III

(10) Patent No.: US 11,392,219 B2
(45) Date of Patent: *Jul. 19, 2022

(54) DETERMINING LOCATIONS OF ELECTRO-OPTICAL PENS

(71) Applicant: Hewlett-Packard Development Company, L.P., Spring, TX (US)

(72) Inventor: Fred Charles Thomas, III, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,049

(22) Filed: Feb. 26, 2021

(65) Prior Publication Data
US 2021/0181866 A1    Jun. 17, 2021

Related U.S. Application Data

(63) Continuation of application No. 16/481,642, filed as application No. PCT/US2017/060597 on Nov. 8, 2017, now Pat. No. 10,936,089.

(51) Int. Cl.
*G06F 3/0346*    (2013.01)
*G06F 3/03*    (2006.01)
(Continued)

(52) U.S. Cl.
CPC .......... *G06F 3/0346* (2013.01); *G06F 3/0317* (2013.01); *G06F 3/0321* (2013.01);
(Continued)

(58) Field of Classification Search
CPC .... G06F 3/0346; G06F 3/0317; G06F 3/0321; G06F 3/0418; G06F 3/042; G06F 3/0421;
(Continued)

(56) References Cited

U.S. PATENT DOCUMENTS 5,484,966 A   1/1996 Segen
9,201,568 B2  12/2015 Chavez et al.
(Continued)

OTHER PUBLICATIONS

United States Patent and Trademark Office, "Non-Final Office Action," issued in connection with U.S. Appl. No. 16/481,642, dated Jun. 18, 2020, 7 pages.
(Continued)

*Primary Examiner* — Tom V Sheng
(74) *Attorney, Agent, or Firm* — Hanley Flight & Zimmerman LLC

(57) ABSTRACT

Determining locations of electro-optical pens. An example apparatus includes a distance determiner to determine a distance of a pen to a scribing surface based on a first image output by a first imager of the pen and a second image output by a second imager of the pen, the first image associated with a first plane of view and the second image associated with a second plane of view; a tilt orientation determiner to determine a tilt orientation of the scribing surface relative to the pen; a corrector to adjust at least one of the first plane of view or the second plane of view based on the tilt orientation of the scribing surface; and a location determiner to determine a location of the pen relative to the scribing surface based on the at least one of the adjusted first plane of view or the adjusted second plane of view.

20 Claims, 13 Drawing Sheets

(51) Int. Cl.
*G06F 3/041* (2006.01)
*G06F 3/0354* (2013.01)

(52) U.S. Cl.
CPC ........ *G06F 3/03545* (2013.01); *G06F 3/0418* (2013.01); *G06F 3/03542* (2013.01); *G06F 2203/04101* (2013.01)

(58) Field of Classification Search
CPC ............... G06F 3/0425; G06F 3/03542; G06F 3/03545; G06F 2203/04101
USPC .......................................................... 345/175
See application file for complete search history.

(56) References Cited

U.S. PATENT DOCUMENTS

| | | | | |
|---|---|---|---|---|
| 9,262,015 | B2* | 2/2016 | Avrahami | G06F 1/1686 |
| 9,609,200 | B2* | 3/2017 | Narang | H04N 5/44504 |
| 10,936,089 | B2* | 3/2021 | Thomas, III | G06F 3/0346 |
| 2002/0163511 | A1 | 11/2002 | Sekendur | |
| 2006/0139314 | A1* | 6/2006 | Bell | G01S 17/894 |
| | | | | 345/156 |
| 2006/0284859 | A1* | 12/2006 | Lapstun | G06K 9/2063 |
| | | | | 345/173 |
| 2010/0101873 | A1 | 4/2010 | Lapstun et al. | |
| 2010/0309168 | A1 | 12/2010 | Huang | |
| 2011/0013001 | A1* | 1/2011 | Craven-Bartle | G06K 9/2036 |
| | | | | 348/61 |
| 2011/0242006 | A1 | 10/2011 | Thompson et al. | |
| 2012/0098746 | A1* | 4/2012 | Ogawa | G02B 13/06 |
| | | | | 345/158 |
| 2012/0327031 | A1* | 12/2012 | Fujioka | G06F 3/0428 |
| | | | | 345/175 |
| 2013/0153787 | A1* | 6/2013 | Geaghan | G06F 3/0321 |
| | | | | 250/458.1 |
| 2013/0215148 | A1 | 8/2013 | Antonyuk et al. | |
| 2013/0257822 | A1 | 10/2013 | Holmgren et al. | |
| 2014/0129990 | A1 | 5/2014 | Xin et al. | |
| 2014/0145066 | A1* | 5/2014 | Geaghan | G06F 3/0321 |
| | | | | 250/206.1 |
| 2015/0153902 | A1* | 6/2015 | Suzuki | G06F 3/013 |
| | | | | 345/175 |
| 2016/0139691 | A1* | 5/2016 | Li | G06F 3/03545 |
| | | | | 345/179 |
| 2016/0286190 | A1* | 9/2016 | Kubota | H04N 9/3194 |

OTHER PUBLICATIONS

United States Patent and Trademark Office, "Notice of Allowance," issued in connection with U.S. Appl. No. 16/481,642, dated Nov. 24, 2020, 10 pages.

Yedan Qian, "AR Controller for 3D Creation and Interaction, 3D-stylus," 2015, http://www.qianyedan.com/3d-stylus/, 4 pages.

Apple Inc., "Apply Pen Tilt behavior in Motion," Motion User Guide, https://support.apple.com/kb/PH16473?locale=en_US, retrieved on May 26, 2021, 2 pages.

International Search Authority, "International Search Report," issued in connection with International Patent Application No. PCT/US2017/060597, dated Oct. 18, 2018, 2 pages.

International Search Authority, "Written Opinion," issued in connection with International Patent Application No. PCT/US2017/060597, dated Jul. 31, 2018, 3 pages.

International Bureau, "International Preliminary Report on Patentability," issued in connection with International Patent Application No. PCT/US2017/060597, dated May 12, 2020, 4 pages.

* cited by examiner

DETERMINING LOCATIONS OF ELECTRO-OPTICAL PENS

RELATED APPLICATIONS

This patent arises from a continuation of U.S. patent application Ser. No. 16/481,642, now U.S. Pat. No. 10,936,089, which was filed on Jul. 29, 2019. U.S. patent application Ser. No. 16/481,642 is a national stage application under 35 U.S.C. § 371 of International Patent Application No. PCT/US2017/060597, which was filed on Nov. 8, 2017. U.S. patent application Ser. No. 16/481,642 and International Patent Application No. PCT/US2017/060597 are hereby incorporated by reference in their entireties. Priority to U.S. patent application Ser. No. 16/481,642 and International Patent Application No. PCT/US2017/060597 is hereby claimed.

BACKGROUND

A digital pen or smart pen is an input device that captures the handwriting or brush strokes of a user and converts the same into digital data that can be utilized by various applications. Camera-based digital pens can use digital paper as a writing surface. The digital paper is used to facilitate location detection of the digital pen on the writing surface.

Digital paper can include printed dot patterns that uniquely identify position coordinates on the paper. For example, a printed dot pattern can include microscopic marks that are associated with the writing surface of the paper, a display, or a whiteboard and indicate the location of the pen's nib. These location marks can be captured in real-time by the camera as the pen's nib traverses the writing surface. The digital pen records the dot patterns associated with the pen's nib over time and uploads the patterns to a pen based computer, which can determine the location of the pen's nib over time and communicate this information in real-time to a host with a display based computer for graphic rendering or digitally store this information for later communication to a computer based graphic rendering system.

BRIEF DESCRIPTION OF THE DRAWINGS

Wherever possible the same reference numbers will be used throughout the drawing(s) and accompanying written description to refer to the same or like parts.

DETAILED DESCRIPTION

Figure 1:
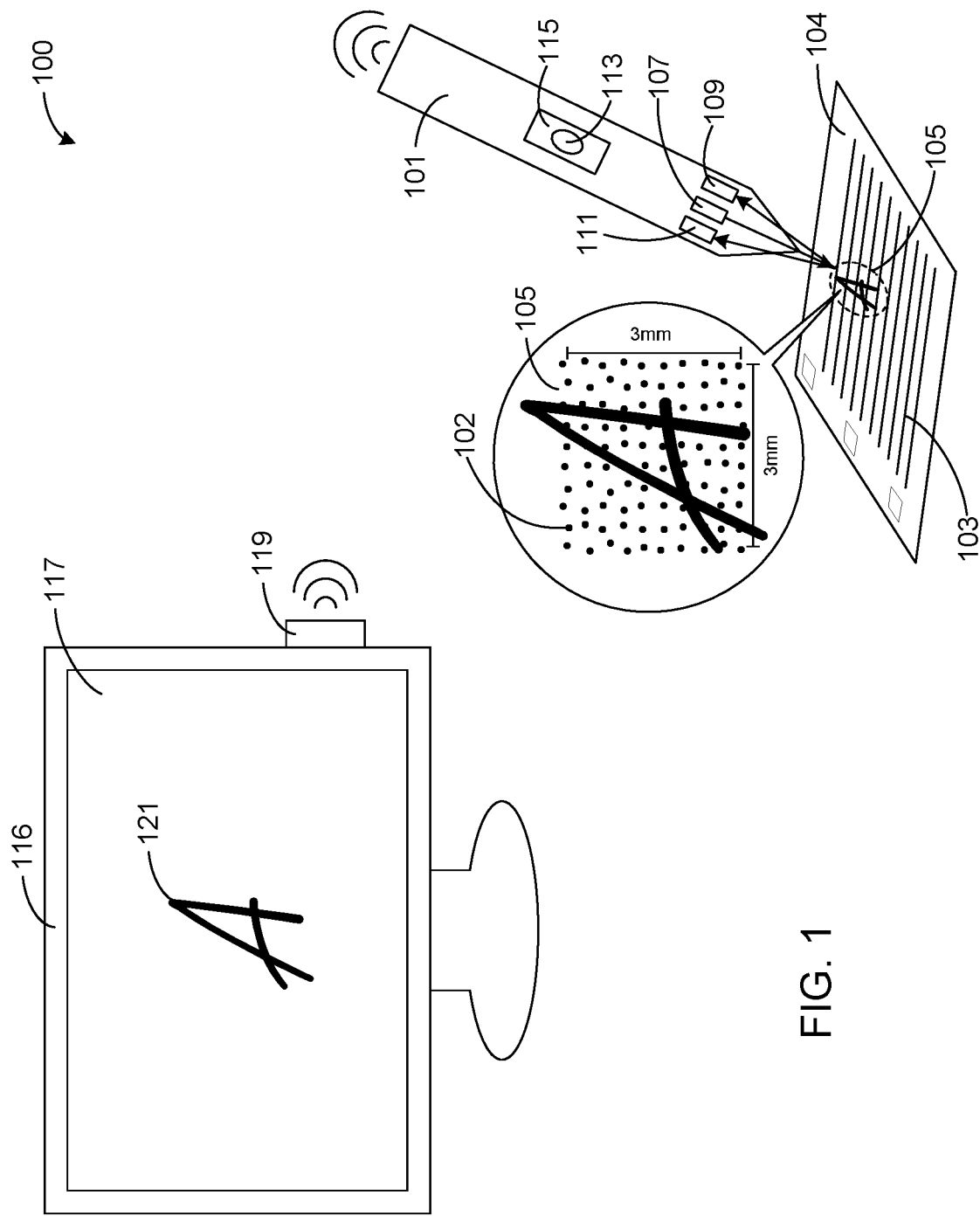
FIG. 1 depicts an example operating environment of a pen location determiner.

Example electro-optical (EO) pens described herein utilize a plurality of sub-miniature digital camera imagers. In some examples, the imagers have a global shutter and synchronization capability that enables the EO pens to capture and decode three-dimensional information from a scribing surface (display, whiteboard, paper, etc.) at high translational rates of motion of the EO pen. Thus, some example EO pens can determine with higher accuracy, using lower positional encoding pattern areal density (resulting in approximately 50 percent more transparent displays) and with significantly reduced computational overhead, the tilt orientation of the EO pen relative to a position encoded scribing surface. This enables more efficient and higher rate decoding of positional encoding patterns on the EO pen scribing surface. The sub-miniature digital camera imagers provide example EO pens with dynamic (real-time) stereoscopic three dimensional (3D) imaging capabilities. Stereoscopic 3D imaging presents two offset images that can be combined to give the perception and measurement of 3D depth with high resolution. Other advantages of the example EO pens include but are not limited to increased depth-of-field (DoF), pen shaft/nib centration in the pen barrel and the capacity to determine an EO pen's full rotational and hover orientation relative to a scribing surface. Also, in some examples, the need to accommodate a fold mirror to relay images captured from a lens to a digital imager, is eliminated. Thus, examples described herein significantly enhance the operational performance of EO pens.

In some examples, the position encoded data patterns are positioned relative to a reference grid, and enable the EO pen to determine the location of the nib of the EO pen on a scribing surface. An example EO pen uses a single digital camera to capture images of the location of the pen's nib on the scribing surface relative to the position encoded pattern. Depending on the pattern type that is used, a removal of perspective distortion from images when the EO pen is tilted can be computationally difficult and very time intensive using single camera methods. Such methods include vanishing point line-projection fitting and the associated iterative convergent calculations. However, perspective vanishing point calculations become decreasingly accurate as the tilt orientation of the pen becomes larger. Other approaches use Fourier image transform methods to extract highly graphically dense dot pattern image content located on or adjacent to principal orientation and encoding axes which are extracted by the computationally intense transforms. These methods may have included hardware dedicated digital signal processing (DSP) methods to extract information for single images. Providing second camera stereographic information relative to the graphically encoded scribing plane (paper, display or whiteboard) computationally simplifies and renders more accurate the determination of the tilt and rotational orientation of the EO pen relative to the scribing surface as described herein.

The computational methods that are used by single camera EO pens may be paired with either highly bounded positional encoding marks (exact geometric location known for a large set of marks/dots) or a significantly higher density of encoding marks on the scribing surface (paper or display). For example, in one approach, an EO pen encoding pattern uses one fixed mark for each variable position encoded mark to accommodate calculations used to rectify perspective distortion in the image from dynamically varying pen tilt as the pen user moves the EO pen across the scribing surface. In some examples described herein, a reduction in the areal density of encoding marks by approximately fifty percent or more is enabled by the elimination of most if not all fixed position alignment marks. This results in display films with encoded dots/marks that are more transparent. Such display films are more aesthetically and visually functional. Some examples also provide tilt and rotational orientation data with accuracy to sub 1 degree angles between the scribing surface and the EO pen. This enables improved positional transformation of perspective distorted images of the positional dot data that is used to decode reference grid decodable data.

It should be appreciated that because two imagers are used, in some examples, one of the imagers will have a reduced depth of field observation orientation relative to the other imager because it has a differing proximity to the scribing surface. Selective decoding of a tilt normalized pattern from the imager with the greater depth of field observation orientation provides improved system performance by providing increased operational depth of field for the pen (e.g., by ensuring the use of the imager that has the best focus range for such purposes).

FIG. 1 shows an example operating environment 100 of a pen location determiner. FIG. 1 shows EO pen 101, position encoded pattern 102, non-visible reference grid 103, scribing surface 104, pen pattern 105, light source 107, first imager 109, second imager 111, pen location determiner 113, microprocessor 115, host 116, display 117, receiver 119 and displayed writing 121.

The EO pen 101 is an electronic writing and/or drawing instrument that captures handwriting, or other user directed pen strokes (e.g., patterns), and converts them into digital data. The digital data can be translated into writing and/or drawings that correspond to the pen strokes 105 that are shown on the display 117. In some examples, the EO pen 101 is used in conjunction with a scribing surface 104. The scribing surface 104 includes the position encoded patterns 102, which are patterned markings that identify position coordinates of the EO pen 101 on the scribing surface 104. The patterned markings are positioned relative to a virtual and/or non-visible reference grid 103 and allow the EO pen 101 to determine where the nib of the EO pen 101 is located by decoding the patterned markings location relative to the reference grid 103.

Figure 2:
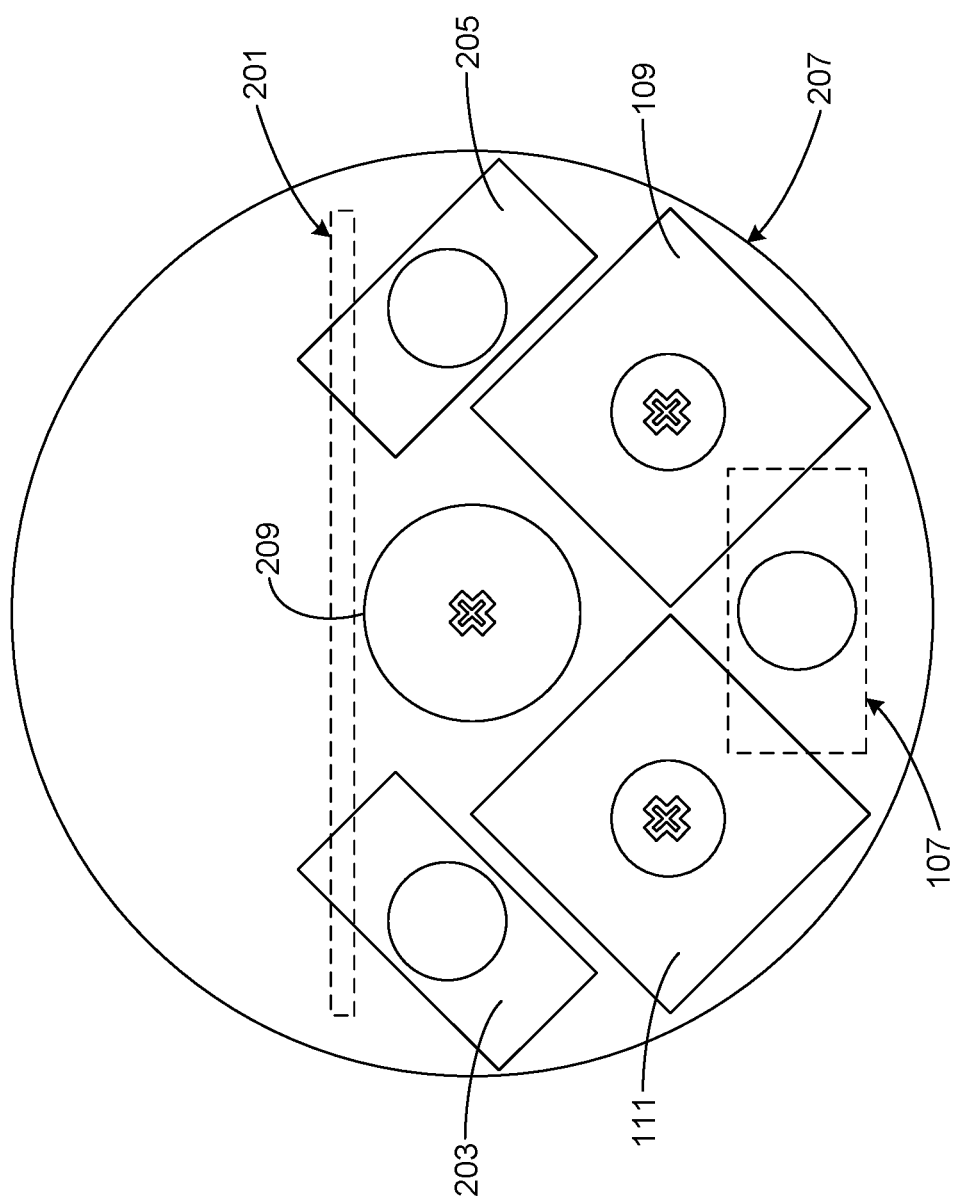
FIG. 2 depicts example parts of an electro-optical (EO) pen.

FIG. 2 is a cross-sectional view of the EO pen 101 and depicts example components of such. Referring to FIG. 2, in some examples, components of the EO pen 101 can include but are not limited to light sources 107, 203 and 205, imagers 109 and 111, printed circuit board (PCB) 201, circular PCB 207 and pen shaft opening 209. In some examples, the EO pen 101 can include a single light source, e.g., light source 107 as shown in FIG. 1. In other examples, the EO pen 101 can include a plurality of light sources, e.g., light sources 107, 203 and 205 as shown in FIG. 2. In some examples, the PCB 201 runs the length of the EO pen 101 and can support the microprocessor 115, Bluetooth system, etc. In some examples, PCB 207 can be located at the front of the EO pen 101 and can face the scribing surface 104 (FIG. 1). It should be appreciated that the component organization shown in FIG. 2 is an example component organization and other component organizations can be used.

Figure 3:
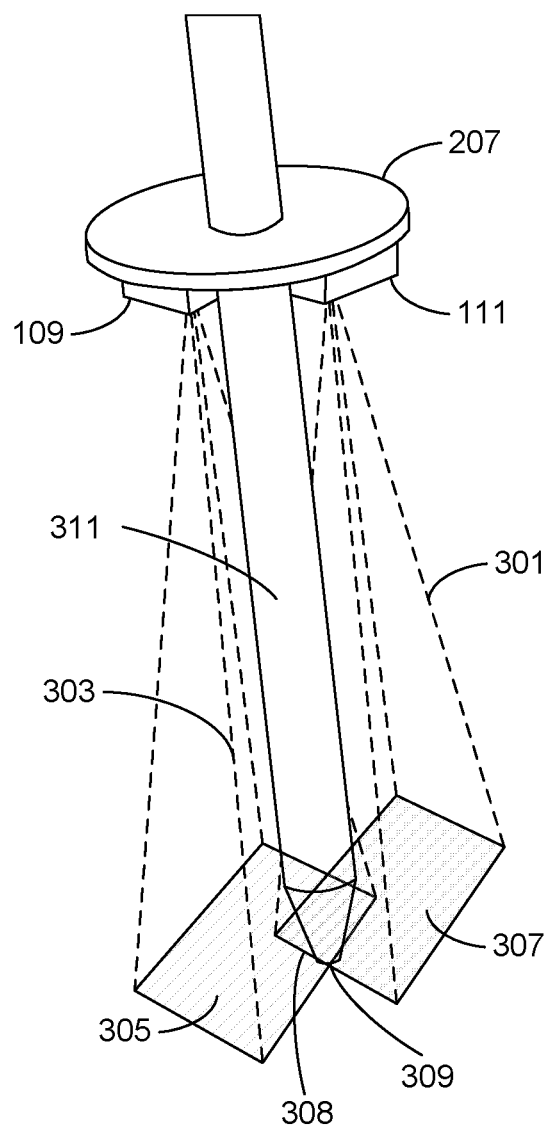
FIG. 3 illustrates an example of orientation of first and second imagers and the overlapping fields of view of the imagers.

As shown in FIG. 1, the EO pen 101 images the scribing surface 104 with imagers 109 and 111. Referring to FIG. 3, in some examples the imagers 109 and 111 can be attached to the small diameter PCB 207 that can be located at the front of EO pen 101. The imagers 109 and 111 face the scribing surface 104 (FIG. 1). As shown in FIG. 3, the imager 109 has a first field of view 301 and the imager 111 has a second field of view 303. The field of view 301 and the field of view 303 overlap to enable stereographic depth determination corresponding to imaged points as described herein below. In addition, the field of view 301 and the field of view 303 overlap to produce a plane of view 308 (in FIGS. 3 305 and 307 are the plane-of-view for imagers 109 and 111 respectively) on the scribing surface 104 (FIG. 1), within which an EO pen nib 309 is tangentially located. As shown, in FIG. 3, the pen nib 309 is located at the end of the pen stylus 311. The area that is imaged is illuminated by the light source 107 (FIG. 1). In some examples, the light source 107 can include a diode. In other examples, other types of light sources can be used.

In the FIG. 3 example, the first imager 109 and the second imager 111 image the part of the scribing surface 104 where the nib 309 of the EO pen 101 is positioned. The first imager 109, images the scribing surface 104 (FIG. 1), from a first perspective, and the second imager 111, images the scribing surface 104 (FIG. 1), from a second perspective. The first imager 109 and the second imager 111 capture tangential images of the nib 309 of the EO pen 101 relative to the position encoded patterns 102 (FIG. 1) of the scribing surface 104 (FIG. 1). The light source 107 (FIG. 1) is used to illuminate the scribing surface 104 (FIG. 1) in order to facilitate imaging by first and second imagers 109 and 111. In some examples, the light source 107 (FIG. 1) can be strobed in order to both capture position encoded pattern 102 (FIG. 1) motion and preserve EO pen battery life.

Figure 4:
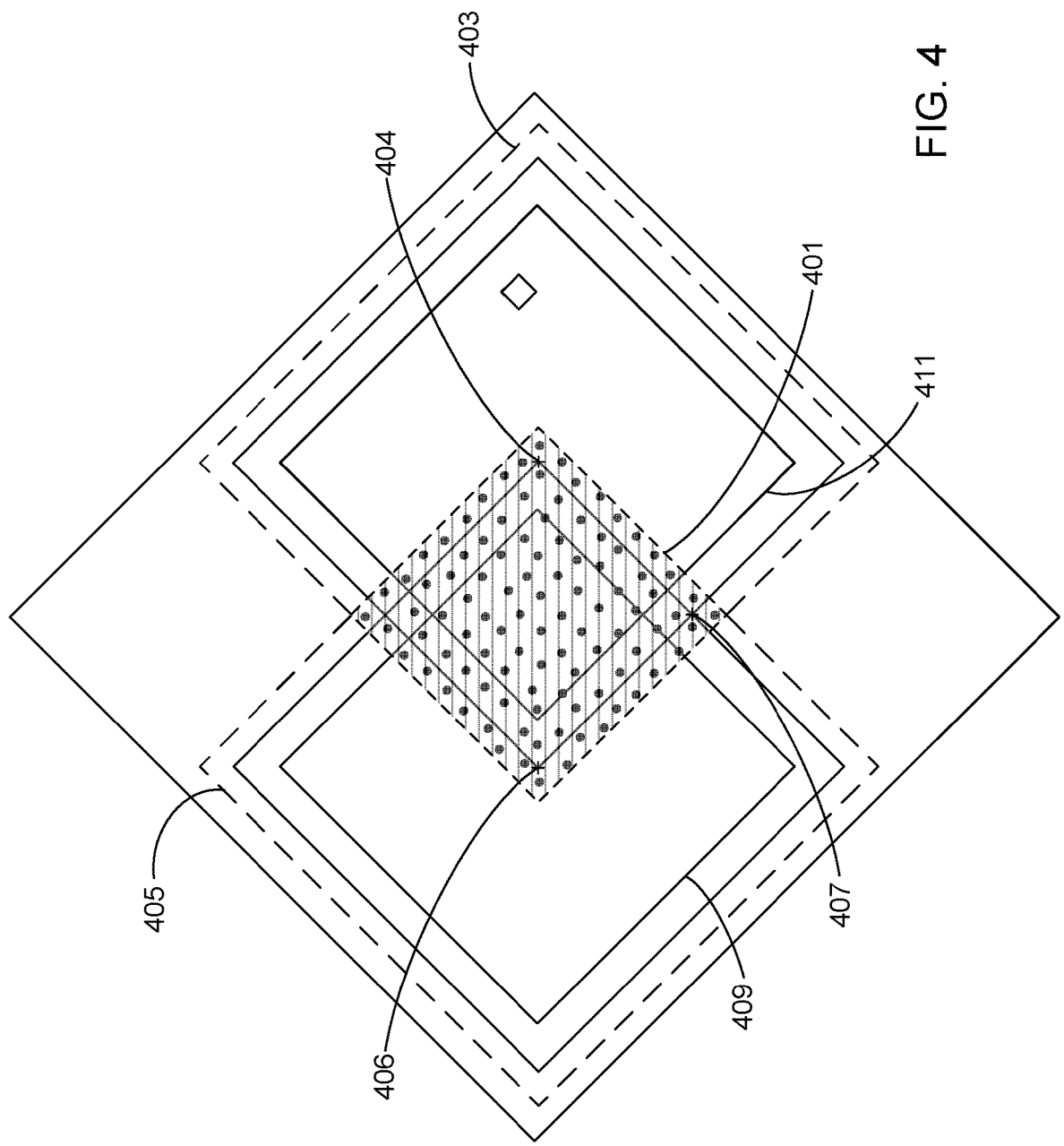
FIG. 4 illustrates an example of a first and a second pixel footprint of a first and second imager on a scribing surface.

FIG. 4 illustrates a first 403 and second 405 pixel footprint of a first and second imager on a scribing surface. Referring to FIG. 4, the first imager 109 (FIG. 1) and the second imager 111 (FIG. 1) produce, respectively, a first pixel footprint 403 and a second pixel footprint 405 of the scribing surface 104 (FIG. 1). The center of the field of view of the first pixel footprint is 404 and the center of the field of view of the second pixel footprint is 406. The first pixel footprint 403 and the second pixel footprint 405 overlap to define the boundaries of a stereoscopic dot-sample plane 401. It should be noted that for FIG. 4 the relative positon and overlap of the stereoscopic dot-sample plane 401 is for an orientation of the EO pen normal to the scribing surface. As the orientation of the EO pen rotates relative to the scribing surface the overlap of images defining the dot-sample plane 401 will dynamically change. In some examples, a plurality of dots (e.g., three dots, etc.) in the stereoscopic dot-sample plane 401 is used to rapidly tabulate multiple 3D (x, y and z) coordinates of the stereoscopic dot-sample plane 401 and thereby the orientation (tilt) of the stereoscopic dot-sample plane. In other examples, other numbers of corresponding dots can be used to rapidly tabulate 3D coordinates (x, y and z) of the stereoscopic dot-sample plane 401 and the orientation (tilt) of the stereoscopic dot sample-plane 401. In some examples with EO pen orientated normal to the scribing surface, the overlapping parts of the first pixel footprint 403 and the second pixel footprint 405 on the scribing surface 104 (FIG. 1) can define a 220×220 pixel area. In other examples with the EO pen orientated normal to the scribing surface, overlapping parts of the first pixel footprint 403 and the second pixel footprint 405 can define other sized pixel areas. The location 407 of the tip or nib of EO pen 101 (FIG. 1) establishes the current point of the pen to dot-plane tilt axial point of rotation. In some examples, two or more stereoscopic imagers (e.g., cameras, etc.) that have different sized pixel footprints can be used. For example, as shown in FIG. 4, a first field of view 409 and a second field of view 411 are associated with first and second imagers that have smaller pixel footprints than the first pixel footprint 403 and the second pixel footprint 405.

Figure 5:
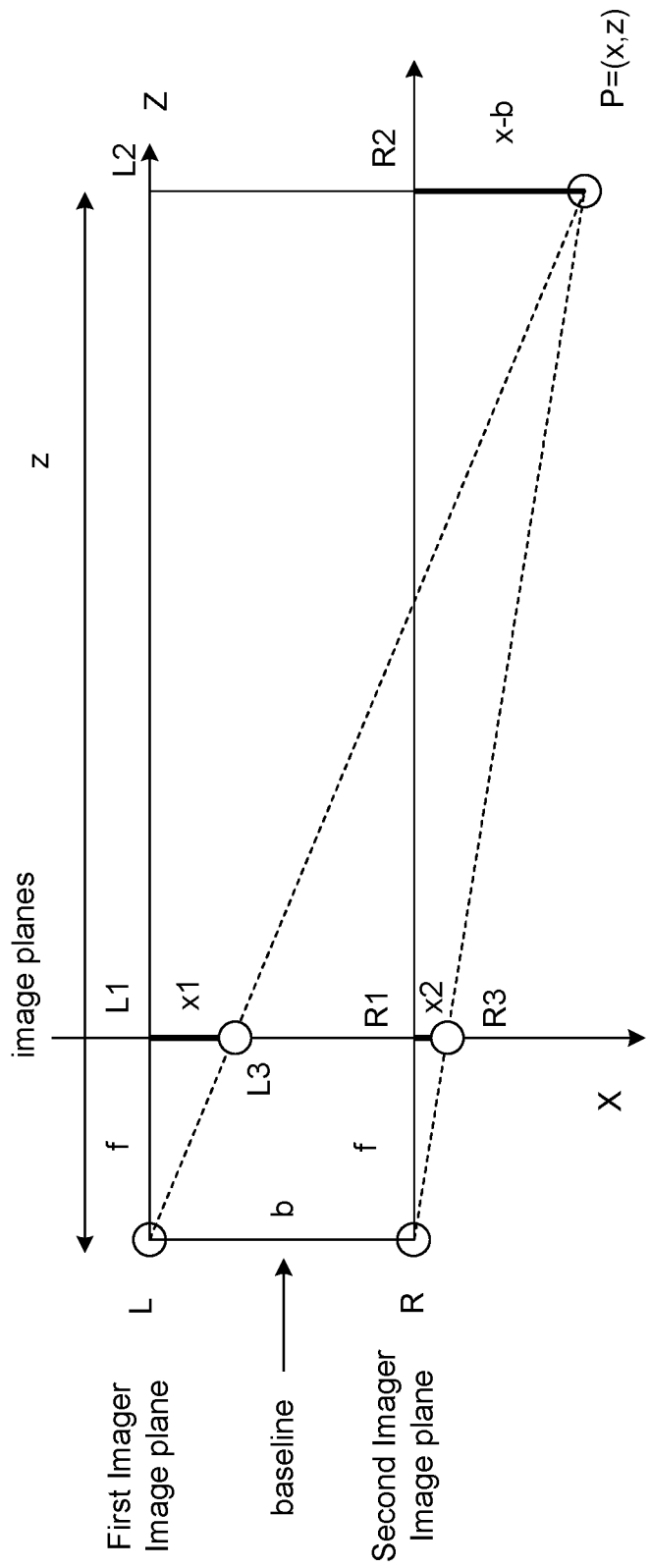
FIG. 5 illustrates factors involved in an example distance measurement for tilted plane encoded dots using triangulation.

FIG. 5 illustrates an example measurement of a distance between an EO pen having first and second imagers and a dot located in a tilted plane of encoded dots (that is associated with a scribing surface). The distance measurement is performed using triangulation based on first and second images that are imaged by the first and second imagers. In the FIG. 5 example, the first and second images are respectively associated with similar triangles LL1L3 and LL2P, and RR1R3 and RR2P. Because LL1L3 and LL2P are similar triangles:

$$z/f = x/x1 \quad (1)$$

Similarly, because triangles RR1R3 and RR2P are similar triangles:

$$z/f = (x-b)/x2 \quad (2)$$

In some examples, for a Y-axis that is perpendicular to the page in FIG. 5:

$$z/f = y/y1 = y/y2 \quad (3)$$

For stereo imagers with parallel optical axes, focal length f, baseline b and corresponding image points (x1, y1) and (x2, y2), the location of the 3D point can be derived from equations (1), (2) and (3) as follows:

$$\text{Depth } z = f*b/(x1-x2) = f*b/d$$

$$x = x1*z/f \text{ or } b + x2*zf$$

$$y = y1*z/f \text{ or } y2*z/f$$

It should be appreciated that d is the disparity in the position of an image of a dot in the imager plane of the first imager and the image of the dot in the imager plane of the second imager. More specifically, it is the distance between corresponding points when the two images are superimposed. The disparity data can be used to determine a disparity map, which can be converted to a 3D mapping of the imaged point or points. In this manner the 3D orientation of the scribing surface can be determined. In some examples, the 3D "reconstruction" is performed as described herein with reference to FIGS. 6 and 10. In other examples, other manner of converting the disparity data into 3D data can be used. Because they are not reliant on time intensive single camera based computations, in examples, the computation of multiple dot distances facilitate the rapid determination of the 3D orientation of the scribing surface plane.

Based on the determined 3D tilt orientation of the scribing plane, the plane of view associated with either the first perspective or the second perspective is corrected. The perspective that is corrected is determined based on a comparison of the depth of field associated with the first perspective and the depth of field associated with the second perspective. In particular, the plane of view associated with the perspective that has the best depth of field is corrected (e.g., adjusted). In some examples, the perspective that is deemed to have the best depth of field is the perspective that is closest to the scribing surface. For example, the perspective that is closest to the scribing surface can be determined by identifying the closest point to each imager on the scribing surface and then comparing the distances to those points to determine which point/imager is closest. Any other manner of determining the perspective that is closest to the scribing surface can additionally or alternatively be used. The coordinates of the EO pen are determined based on the corrected plane of view. In particular, the location of the nib of the EO pen on the scribing surface can be accurately determined because of the ability to precisely determine the location of dots based on the perspective corrected distorted image relative a reference grid.

Referring again to FIG. 1, the EO pen location determiner 113 implements the use of stereoscopic images to determine the coordinates of the nib of the EO pen 101 on the scribing surface 104 as is described herein. Based on the coordinates, EO pen location determiner 113 determines and/or updates the location of the EO pen 101 on the display 117, such as by providing inputs to a display scribing application. As a part of the determining and/or updating of the location of the EO pen 101 on the display 117, a distance between the EO pen 101 and the scribing surface 104 at a plurality of points is determined which provides a plurality of distance measurements (e.g., from the plane of view) upon which a tilt orientation of the scribing plane relative to the pen is determined.

In operation, the first imager 109 and the second imager 111 image in real-time the position encoded scribing surface 104 of either a display screen, paper, whiteboard or other future media. As described hereinabove, the field-of-view of the first imager 109 and the field-of-view of the second imager 111 at least partially over-lap on the scribing surface 104. The overlapping portion of the field-of-view of the first imager 109 and the field-of-view of the second imager 111 define a plane-of-view (PoV) that is used to cross-correlate corresponding dots (e.g., marks, etc.) imaged by the first imager 109 and the second imager 111. In some examples, stereographic image processing can be applied on the shared image dots via appropriate computation of the distance to the scribing plane from the pen at several points to obtain the pen to scribing surface tilt orientation as discussed herein. In some examples, the overlapping portion of these images change with a pen to scribing surface tilt orientation. In examples, sufficient corresponding imager dots are used to perform high accuracy (many sample) calculations of the pen to scribing surface tilt orientation. In some examples there are more than thirty corresponding imager dots. In other examples, the number of corresponding imager dots can be more or less than thirty. In some examples, from these corresponding imager dots multiple distance measurements can be performed by logic circuitry (e.g., a microprocessor) of the EO pen 101 and can be used to compute the tilt orientation of the scribing plane relative to the EO pen 101. Using the scribing plane tilt orientation information the EO pen 101 then corrects the PoV of one of the imagers. In some examples, the imager that is selected for PoV correction is chosen based on a determination that the imager has the best depth-of-field as compared to the other imager. In some examples, the imager with the best depth-of-field is determined to be the imager that is closest to the scribing surface. In some examples, the imager with the least number of detected errors in the dot pattern is selected for pattern decode. In some examples, the selection depends on the orientation of the pen (and thus the orientation of the imagers) at the time that the determination is made. Based on the selection of the imager with the best depth-of-field or alternative criteria, the image is corrected for image perspective distortion that is caused by the dynamically changing tilt orientation of the EO pen 101 relative to the scribing surface 104.

The image that is corrected for image perspective distortion is the image that is used to determine the location of the dots relative to a reference grid. In this manner, the position of the dots can be reliably decoded to determine where the tip or nib of the EO pen 101 is located on the scribing surface 104. In some examples, the position of the dots can be reliably decoded to an accuracy of plus or minus 15 microns. In other examples, the position of the dots can be reliably decoded with greater accuracy. The pen tip/nib location/coordinate information is then communicated (e.g., via a wireless Bluetooth (or other) communications packet) back to the host computer system 116 (personal computer, notebook, Workstation, Tablet, phone, etc.) to be used by a display scribing application to update the EO pen 101 location on the display 117, e.g., of the host computer system 116, with high accuracy and low-latency. In some examples, the location/coordinate information is communicated at 120 hertz or higher. In other examples, the location/coordinate information is communicated at other frequencies. In some examples, for paper scribing surface applications the coordinates can be stored in a memory of the EO pen 101 for later download to a digital computing system for image or text secondary inclusion in documents/drawings and/or potentially their further manipulation in a workflow. In some examples, the imager orientations can be orthogonal (rotated 90 degrees) relative to each other to achieve the smallest diameter EO pen based on the size of the imagers selected. In some examples, the images can be manipulated (rotated) relative to each other as a part of an image processing sequence to obtain epipolar alignment. In other examples the images may not be rotated relative to each other to obtain epipolar alignment. In some examples, a small foot-print and low power multi-core vision embedded system-on-chip (SoC) that has been developed for virtual and augmented reality headsets as well as drone vision-based flight control applications can be used.

Figure 6:
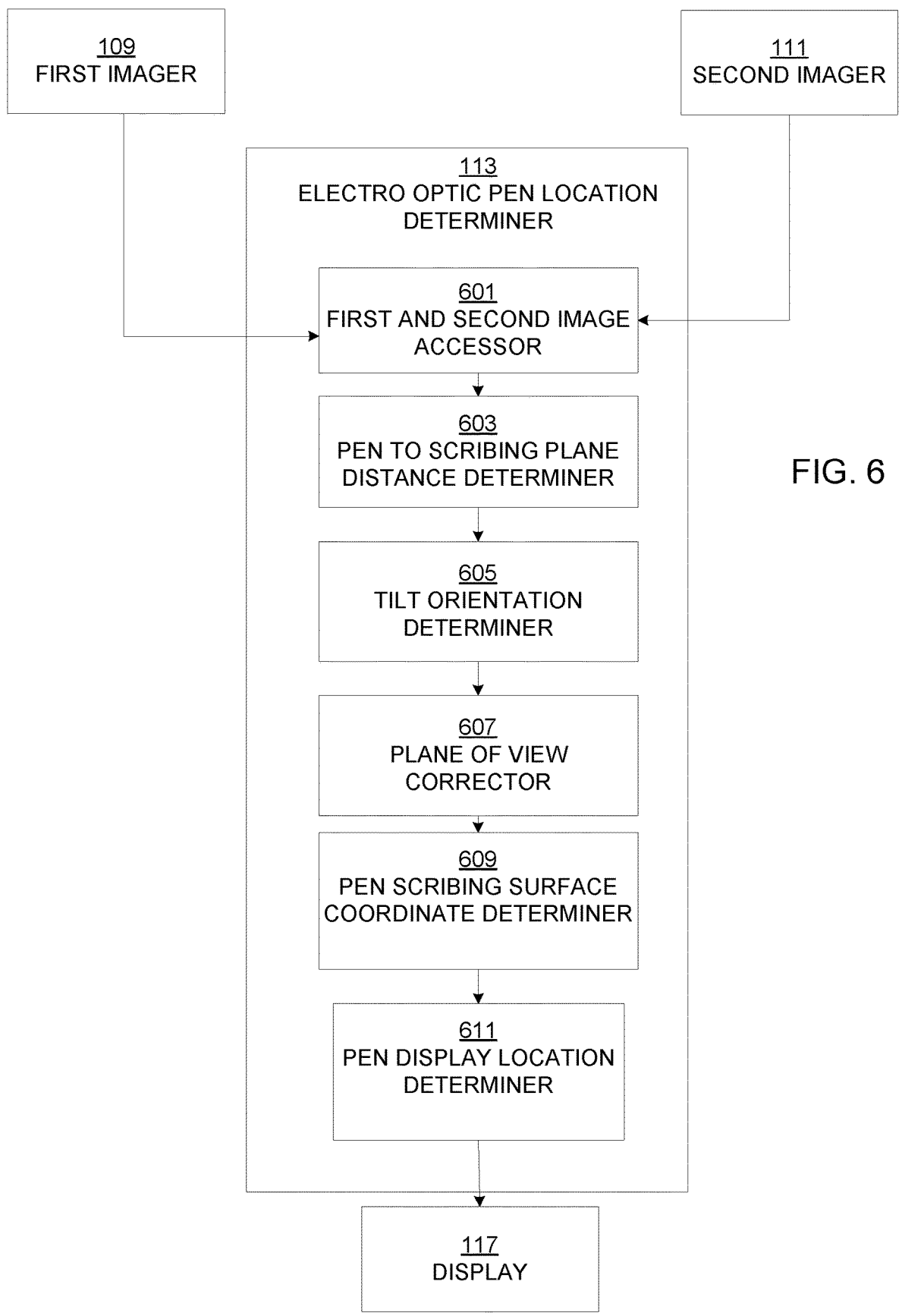
FIG. 6 depicts example components of an EO pen location determiner.

FIG. 6 is a schematic illustration of components of an EO pen location determiner 113. In the FIG. 6 example, EO pen location determiner 113 includes image accessor 601, pen-to-scribing-plane distance determiner 603, tilt orientation determiner 605, plane of view corrector 607, pen scribing surface coordinate determiner 609 and pen display location determiner 611.

Referring to FIG. 6, image accessor 601 accesses a first image of a scribing surface that is imaged from a first perspective and a second image of the scribing surface that is imaged from a second perspective. The first image has a first field of view and the second image has a second field of view. The first field of view and the second field of view partially overlap to define a plane of view as described herein with reference to FIGS. 3 and 4. Image accessor 601 accesses the first and the second images from the first imager 109 and the second imager 111 in real time. Information from the plane of view provides image information from the scribing surface that is used to determine pen location.

Pen-to-scribing-plane distance determiner 603 determines a distance from a pen to a scribing plane at a plurality of points. The determining of the distance from the pen to the scribing plane at the plurality of points produces a plurality of distance measurements. In some examples, pen-to-scribing-plane distance determiner 603 determines a distance from a pen to the scribing plane at a plurality of points by cross-correlating corresponding dots in the plane of view of the images that are imaged by the first imager 109 and the second imager 111. In some examples, pen-to-scribing-plane distance determiner 603 uses stereographic image processing techniques to process images of the shared image dots to determine the distance to the scribing plane from the pen at several points as discussed hereinabove. In some examples, pen-to-scribing-plane distance determiner 603 determines the distance to the scribing plane from the pen at several points by determining an overlap region of the first and the second fields of view, identifying dots in the overlap region and determining the distance to a plurality of dots in the overlap region. Pen-to-scribing-plane distance determiner 603 uses triangulation to determine the z depth of each of a plurality of dots. In some examples, pen-to-scribing-plane distance determiner 603 can use a formula such as $f*b/(x1-x2)$ to determine the distance z to each of a plurality of dots, where x1 and x2 are image points associated with the first imager and the second imager of FIG. 5. In other examples, other formulas can be used to determine the distance z to each of a plurality of dots. Pen-to-scribing-plane distance determiner 603 provides this information to tilt orientation determiner 605 to use to determine the tilt orientation of the scribing plane.

Tilt orientation determiner 605 determines the tilt orientation of the scribing plane relative to the pen based on the plurality of distance measurements z performed by pen-to-scribing-plane distance determiner 603. In some examples, tilt orientation determiner 605 determines the tilt orientation of the scribing plane relative to the pen by accessing the determined dot distances z and determining the three dimensional orientation of the scribing plane based on the determined distances z. In some examples, three dots are used to calculate the orientation of the dot plane to high accuracy (e.g., the distances for three dots in the plane are used). In other examples, other numbers of dots can be used.

Tilt orientation determiner 605, based on the distance z to each of the plurality of dots, can determine the three-dimensional coordinates of the dots using equations such as the following:

$$z=f*b/(x1-x2)=b/d$$

$$x=x1*z/f \text{ or } b+x2*z/f$$

$$y=y1*z/f \text{ or } y2*z/f$$

In this example y is the y-coordinate of the three-dimensional coordinates of a dot. Moreover, y1 and y2 are image points corresponding to the dot and are associated with a first imager and a second imager, such as the first and second imagers of FIG. 5 (y1 and y2 are not shown in FIG. 5 for purposes of clarity and brevity but are analogous to image points x1 and x2). In other examples, other equations and/or manner of determining the coordinates of the dots can be used.

Tilt orientation determiner 605, based on the coordinates, can determine the three-dimensional orientation of the dot plane/scribing surface. For example, for dots/points P, Q and R having coordinates P(1,−1,3), Q(4,1,−2) and R(−1,−1,1) tilt orientation determiner 605 can determine the orientation of the dot plane/scribing surface by determining the plane that passes through such points. In some examples, to find the plane passing through points P, Q and R the tilt orientation determiner 605 determines the cross product of a vector "a" from P to Q and a vector "b" from Q to R to obtain a vector orthogonal to the plane. In the preceding example, vector a=<3,2,−5> and vector b=<−5, −2, 3>, thus:

$$\vec{n} = \vec{a} \times \vec{b} = \begin{vmatrix} \hat{i} & \hat{j} & \hat{k} \\ 3 & 2 & -5 \\ -5 & -2 & 3 \end{vmatrix} = <-4, 16, 4>$$

Based on the above, the equation of the plane can be determined to be −4x+16y+4z=−32. The manner of determining tilt orientation described herein above is an example. In other examples, other manner of determining tilt orientation can be used.

Plane of view corrector 607 corrects the plane of view associated with either the first perspective or the second perspective based on a comparison of a depth of field associated with the first perspective and a depth of field associated with the second perspective and/or based on other criteria such as described previously. In some examples, a correction algorithm is used. In some examples the correction algorithm can be implemented in software or hardware or a combination of both. In some examples, plane of view corrector 607 corrects the plane of view associated with either the first perspective or the second perspective by accessing the scribing plane orientation information and based on this information determining whether the first or the second imager has the best depth of field or other preferential selection criteria. The imager that is determined to have the best depth of field is dependent upon the orientation of the EO pen at the point in time at which the determination is made. Plane of view corrector 607 corrects the plane of view using the depth of field of the imager that is determined to have the best depth of field and/or based on other criteria also described previously. In this manner, plane of view corrector 607 uses the orientation of the dot plane to transform the perspective distorted image of the imaged dots to a planar undistorted dot field. In some examples, the imager that is closest to the scribing surface is deemed to have the best depth of field. In other examples, other manner of determining the imager that has the best depth of field can be used. In some examples, the imager with the least number of detected pattern errors such as smudged or distorted dots in the dot pattern can be used.

Pen scribing surface coordinate determiner 609 determines the coordinates of the EO pen on the EO pen scribing surface based on the corrected plane of view. Based on the perspective corrected dot locations, and the reference grid, the location of the EO pen tip is determined. In some examples, grid orientation marks that are imaged by both imagers provide indicators of directionality and a basis for the incremental separation of superimposed reference grid lines. In some examples, the coordinates of the EO pen nib/tip location are communicated back to the host via Bluetooth wireless connection. In other examples, other manner of communicating coordinate information to the host can be used.

Pen display location determiner 611 determines the position of the EO pen on the display 117 based on the pen coordinate information determined by pen scribing surface coordinate determiner 609. In this manner, the handwriting or brush strokes 121 (FIG. 1) of a user on a scribing surface can be reproduced on display 117.

While an example manner of implementing the EO pen location determiner 113 of FIG. 1 is illustrated in FIG. 6, the elements, processes and/or devices illustrated in FIG. 6 may be combined, divided, re-arranged, omitted, eliminated and/or implemented in any other way. Further, the example EO pen location determiner includes imager accessor 601, pen-to-scribing-plane distance determiner 603, tilt orientation determiner 605, plane of view corrector 607, pen scribing surface coordinate determiner 609 and pen display location determiner 611. These elements and/or, more generally, the example EO pen location determiner 113 of FIG. 6 may be implemented by hardware, software, firmware and/or any combination of hardware, software and/or firmware. Thus, for example, any of the example imager accessor 601, pen-to-scribing-plane distance determiner 603, tilt orientation determiner 605, plane of view corrector 607, pen scribing surface coordinate determiner 609 and pen display location determiner 611 and/or, more generally, the example EO pen location determiner 113 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, EO pen location determiner, imager accessor 601, pen-to-scribing-plane distance determiner 603, tilt orientation determiner 605, plane of view corrector 607, pen scribing surface coordinate determiner 609 and pen display location determiner 611 is/are hereby expressly defined to include a tangible computer readable storage device or storage disk such as a memory, a digital versatile disk (DVD), a compact disk (CD), a Blu-ray disk, flash (non-volatile) memory etc. storing the software and/or firmware. Further still, the example EO pen location determiner 113 of FIG. 6 may include elements, processes and/or devices in addition to, or instead of, those illustrated in FIG. 6, and/or may include more than one of any or all of the illustrated elements, processes and devices.

Figure 7:
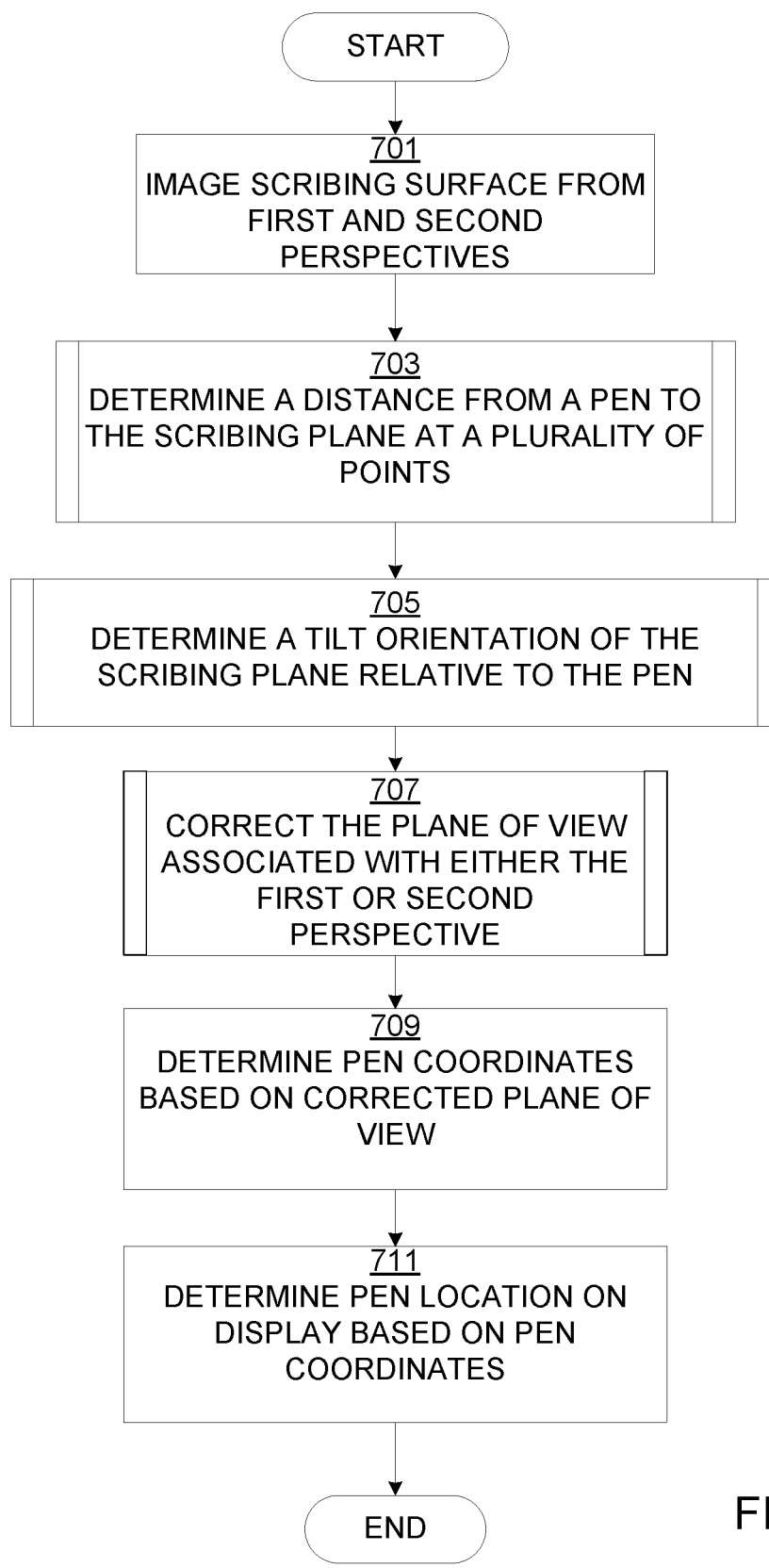
FIG. 7 depicts a flowchart representative of computer readable instructions that may be executed to implement the operations of an example method to determine the location of an EO pen.

A flowchart representative of example machine readable instructions for implementing the example EO pen location determiner 113 of FIG. 6 is shown in FIG. 7. In this example, the machine readable instructions comprise a program for execution by a processor such as the processors 1201 and 1312 shown in the example processor platforms 1200 and 1300 discussed below in connection with FIGS. 12 and 13. The program may be embodied in software stored on a tangible computer readable storage medium such as a CD-ROM, a floppy disk, a hard drive, a digital versatile disk (DVD), a Blu-ray disk, or a memory (flash memory) associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 7, many other methods of implementing the example EO pen location determiner apparatus 113 may alternatively be used. For example, the order of execution of the blocks may be changed, and/or some of the blocks described may be changed, eliminated, or combined.

As mentioned above, the example processes of FIGS. 7-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), nonvolatile flash memory and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is a flowchart of a method for determining the location of an EO pen. The program of FIG. 7 begins at block 701. Referring to FIG. 7, image accessor 601 (FIG. 6) accesses a first image of a scribing surface that is imaged from a first perspective and a second image of the scribing surface that is imaged from a second perspective (block 701). In some examples, the first image has a first field of view and the second image has a second field of view. In some examples, the first field of view and the second field of view at least partially overlap to define a stereoscopic dot-sample plane of view. Image accessor 601 accesses the first and the second images from first and second imagers in real time. In some examples, information from the plane of view provides image information from the scribing surface that is used to determine pen location.

Pen-to-scribing-plane distance determiner 603 (FIG. 6) determines a distance from a pen to a scribing plane at a plurality of points (block 703). The determining of the distance from the pen to the scribing plane at the plurality of points produces a plurality of distance measurements. In some examples, pen-to-scribing-plane distance determiner 603 determines a distance from a pen to the scribing plane at a plurality of points by cross-correlating corresponding dots (e.g., marks, etc.) in the plane of view of the images that are imaged by first imager 109 and second imager 111. In some examples, pen-to-scribing-plane distance determiner 603 uses stereographic image processing to process images of the dots to determine the distance to the scribing plane from the pen at several points as discussed hereinabove. In some examples, pen-to-scribing-plane distance determiner 603 determines the distance to the scribing plane from the pen at several points by determining an overlap region of the first and the second fields of view, identifying dots in the overlap region and determining the distance to a plurality of dots in the overlap region. Pen-to-scribing-plane distance determiner 603 uses triangulation to determine the distance or depth z of each of a plurality of dots. In some examples pen-to-scribing-plane distance determiner 603 can use the formula $b*f/(x1-x2)$ to determine the distance z to each of a plurality of dots, where x1 and x2 correspond to image points associated with imager L and imager R of FIG. 5 (it should be noted that y1 and y2 also associated with imager L and R are not shown in FIG. 5). In other examples, other formulas can be used to determine the distance z to each of the plurality of dots.

Pen-to-scribing-plane distance determiner 603 provides this information to the tilt orientation determiner 605 such that it can be used to determine the tilt orientation of the scribing plane.

Tilt orientation determiner 605 determines the tilt orientation of the scribing plane relative to the pen based on the plurality of distance measurements performed by pen-to-scribing-plane distance determiner 603 (block 705). In some examples, tilt orientation determiner 605 determines the tilt orientation of the scribing plane relative to the pen by determining the three dimensional orientation of the scribing plane based on the distances to the plurality of dots. In some examples, three dots are used to calculate the orientation of the dot plane to high accuracy. In other examples, other numbers of dots are used.

In some examples, tilt orientation determiner 605, based on the distance z to each of the plurality of dots, determines the three-dimensional coordinates of the dots provided by pen-to-scribing-plane distance determiner 603 using equations such as the following:

$$z=f*b/(x1-x2)=b/d$$

$$x=x1*z/f \text{ or } b+x2*z/f$$

$$y=y1*z/f \text{ or } y2*z/f$$

In other examples, other equations and/or manner of determining the coordinates of the dots can be used.

As described above, tilt orientation determiner 605, based on the coordinates of the dots, determines the three-dimensional orientation of the dot plane/scribing surface. For example, for dots/points P, Q and R having coordinates P(1,−1,3), Q(4,1,−2) and R(−1,−1,1) tilt orientation determiner 605 can determine the orientation of the dot plane/scribing surface by determining the plane that passes through those points. In some examples, to find the plane passing through points P, Q and R, the tilt orientation determiner 605 determines the cross product of a vector "a" from P to Q and a vector "b" from Q to R to obtain a vector orthogonal to the plane. In the preceding example, a=<3, 2,−5> and b=<−5,−2,3>, thus:

$$\vec{n} = \vec{a} \times \vec{b} = \begin{vmatrix} \hat{i} & \hat{j} & \hat{k} \\ 3 & 2 & -5 \\ -5 & -2 & 3 \end{vmatrix} = <-4, 16, 4>$$

The equation of the plane is −4x+16y+4z=−32. The manner of determining tilt orientation described herein is an example. In other examples, other manner of determining tilt orientation can be used.

Plane of view corrector 607 corrects the plane of view associated with either the first perspective or the second perspective based on a comparison of a depth of field associated with the first perspective and a depth of field associated with the second perspective (block 707). In some examples, plane of view corrector 607 corrects the plane of view associated with either the first perspective or the second perspective by accessing the scribing plane orientation information and based on this information determining whether the first or the second imager has the best depth of field. The imager that is determined to have the best depth of field is dependent upon the orientation of the EO pen at the point in time at which the determination is made. Other criteria such as discussed previously, can include but is not limited to image content error such as smudged or missing dot/marker, which can be used for determination. Plane of view corrector 607 corrects the plane of view using the depth of field or other criteria of the imager that is determined to have the best depth of field or other criteria.

Pen scribing surface coordinate determiner 609 determines the coordinates of the EO pen on the EO pen scribing surface based on the corrected plane of view (block 709). In some examples, the grid orientation marks from both imagers are used to provided directionality and basis for incremental separation of superimposed reference grid lines. Based on the perspective corrected dot locations, and a reference grid, a decoding/determination of the location of the EO pen tip is performed.

Pen display location determiner 611 determines the position of the EO pen on a display (display 117 in FIG. 1) based on the pen coordinate information accessed from pen scribing surface coordinate determiner 609 (block 711). In some examples, the EO pen nib/tip location can be communicated back to the host for display via Bluetooth wireless connection.

Figure 8:
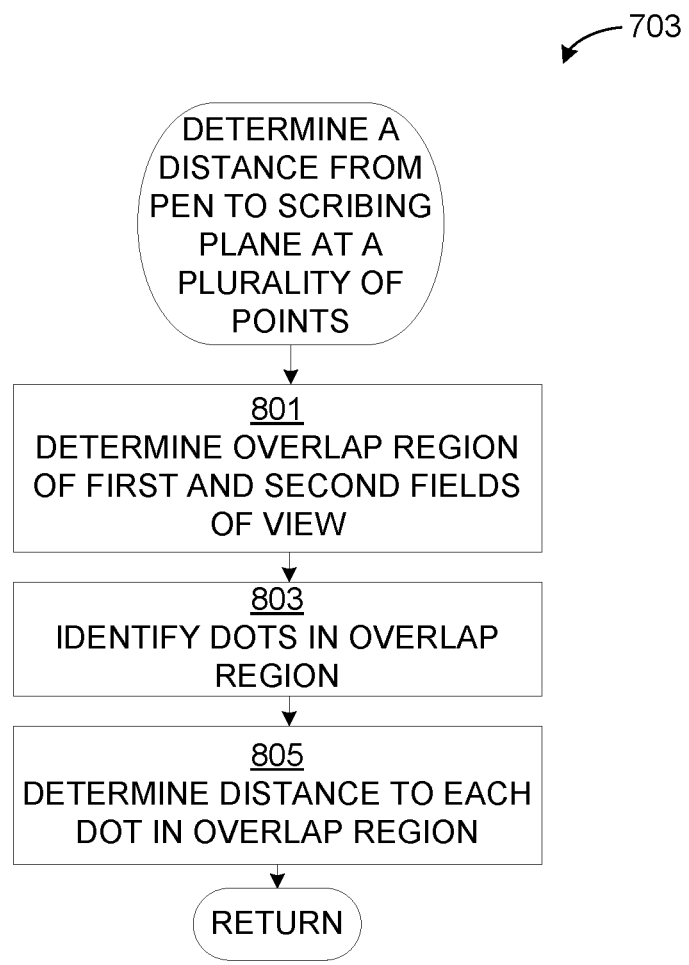
FIG. 8 depicts a flowchart representative of computer readable instructions that may be executed to implement the operations of an example method to determine the distance from an EO pen to a scribing plane at a plurality of points.

FIG. 8 is a flowchart of block 703 of FIG. 7 where the distance from the EO pen to the scribing plane at a plurality of points is determined. Referring to FIG. 7, pen-to-scribing-plane distance determiner 603 determines the overlap region of the first and second fields of view (block 801). Pen-to-scribing-plane distance determiner 603 identifies dots in the overlap region of the first and the second fields of view (block 803) and pen-to-scribing-plane distance determiner 603 determines the distance to dots in the overlap region of the first and the second fields of view (block 805).

Figure 9:
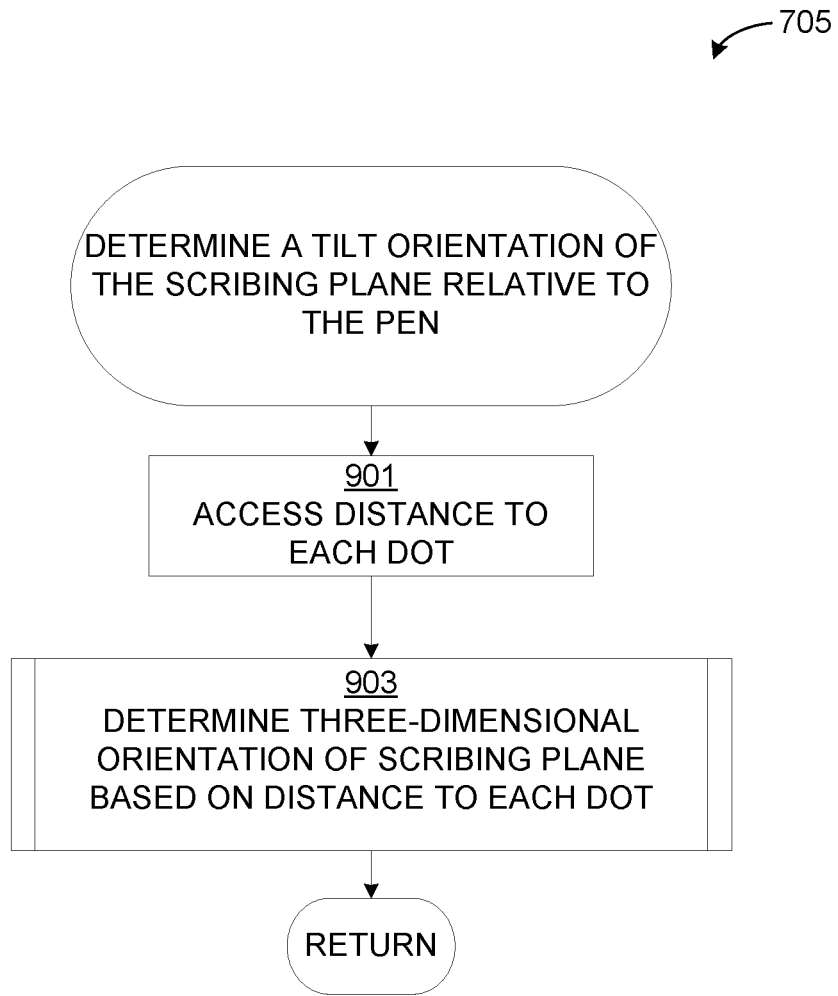
FIG. 9 depicts a flowchart representative of computer readable instructions that may be executed to implement the operations of an example method to determine the tilt orientation of a scribing plane relative to an EO pen.

FIG. 9 is a flowchart of block 705 of FIG. 7 where the tilt orientation of the scribing plane relative to the EO pen is determined. Referring to FIG. 9, tilt orientation determiner 605 accesses the distance to each of the dots in the scribing plane (block 901). Tilt orientation determiner 605 determines the three-dimensional orientation of the scribing plane based on the distance to each dot (block 903).

Figure 10:
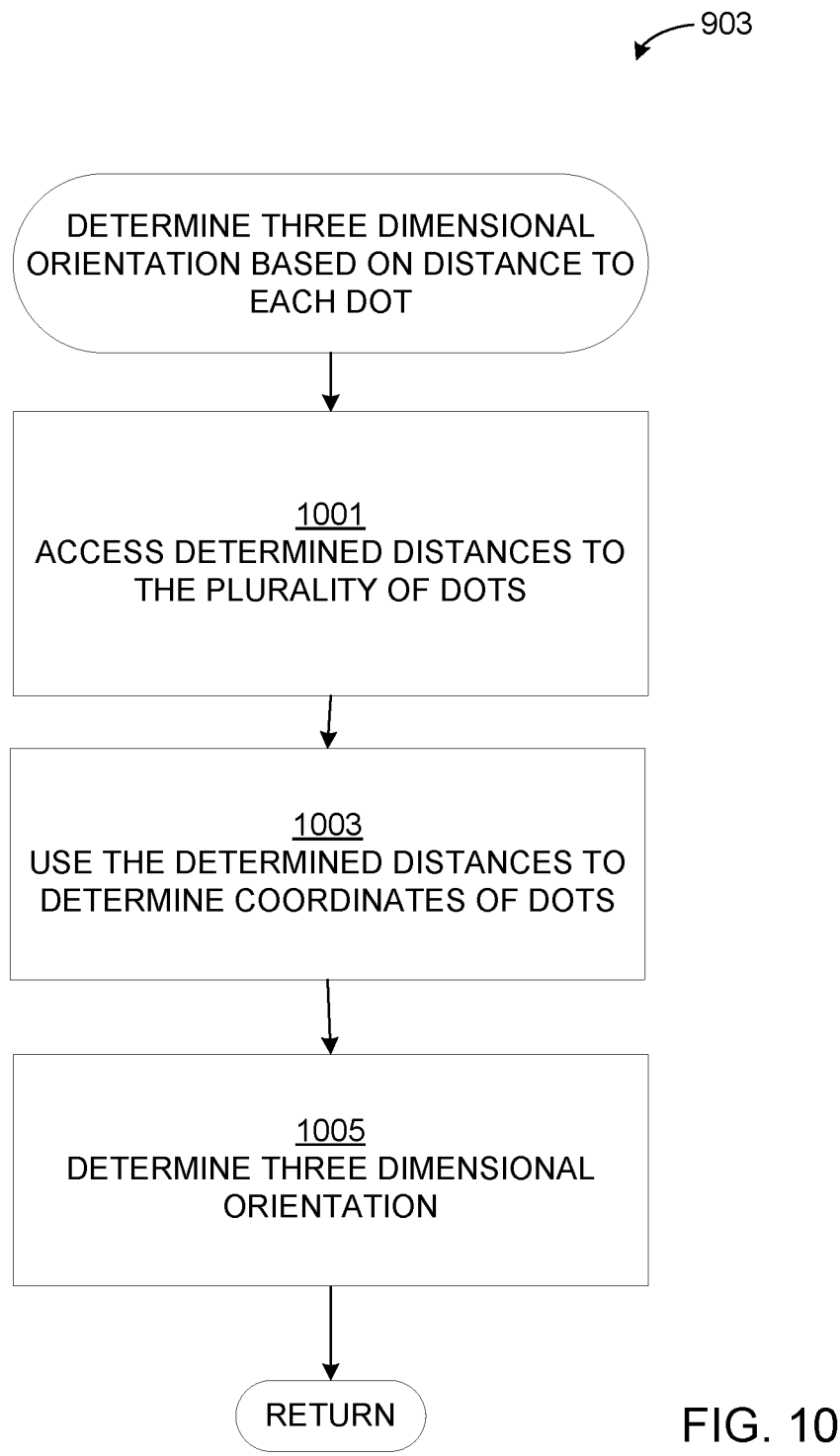
FIG. 10 depicts a flowchart representative of computer readable instructions that may be executed to implement the operations of an example method to determine the three dimensional orientation of a scribing plane.

FIG. 10 is a flowchart of block 903 of FIG. 9 where the three dimensional orientation of the scribing plane is determined based on a determined distance to each of a plurality of dots. Referring to FIG. 10, tilt orientation determiner 605 accesses the determined distances z to each of the plurality of dots (block 1001).

Tilt orientation determiner 605, based on the distance z to each of the plurality of dots, determines the three-dimensional coordinates of the dots (block 1003). In some examples, the three-dimensional coordinates of the dots can be determined using equations such as the following:

$$z = f*b/(x1-x2) = b/d$$

$$x = x1*z/f \text{ or } b + x2*z/f$$

$$y = y1*z/f \text{ or } y2*z/f$$

In other examples, other equations and/or manner of determining the coordinates of the dots can be used.

Tilt orientation determiner 605, based on the coordinates determined at block 1003, determines the three-dimensional orientation of the dot plane/scribing surface (block 1005). For example, for dots/points P, Q and R having coordinates P(1,−1,3), Q(4,1,−2) and R(−1,−1,1) the tilt orientation determiner 605 can determine the orientation of the dot plane/scribing surface by determining the plane that passes through those points. In some examples, to find the plane passing through points P, Q and R the tilt orientation determiner 605 determines the cross product of a vector "a" from P to Q and a vector "b" from Q to R to obtain a vector orthogonal to the plane. In one example, a=<3,2,−5> and b=<−5,−2,3>, thus:

$$\vec{n} = \vec{a} \times \vec{b} = \begin{vmatrix} \hat{i} & \hat{j} & \hat{k} \\ 3 & 2 & -5 \\ -5 & -2 & 3 \end{vmatrix} = <-4, 16, 4>$$

Based on the above, the equation of the plane is −4x+16y+4z=−32. The manner of determining tilt orientation described herein is an example. In other examples, other manners of determining tilt orientation can be used.

Figure 11:
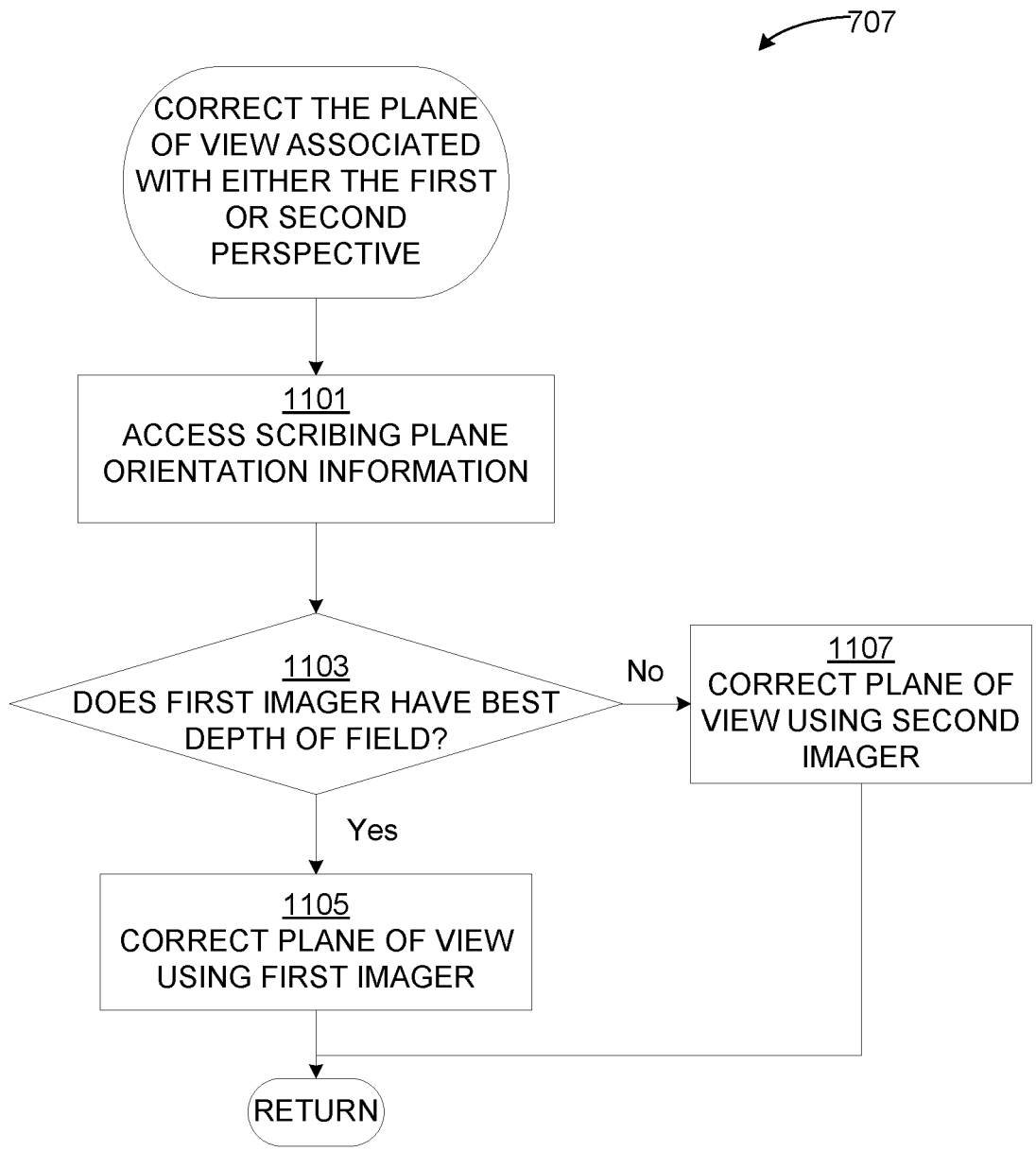
FIG. 11 depicts a flowchart representative of computer readable instructions that may be executed to implement the operations of an example method to correct the plane of view associated with a first or second perspective.

FIG. 11 is a flowchart of block 707 of FIG. 7 where the plane of view associated with the first or second perspective is corrected. Referring to FIG. 11, plane of view corrector 607 accesses scribing plane orientation information (block 1101). Plane of view corrector 607 determines if a first imager of the first and second imagers has the best depth of field (block 1103). If it is determined that a first imager that is assessed for depth of field of the first and second imagers has the best depth of field, the plane of view is corrected using the first imager of the first and second imagers (block 1105). If it is determined that a first imager that is assessed for depth of field does not have the best depth of field, the plane of view is corrected using the second imager (block 1107).

Figure 12:
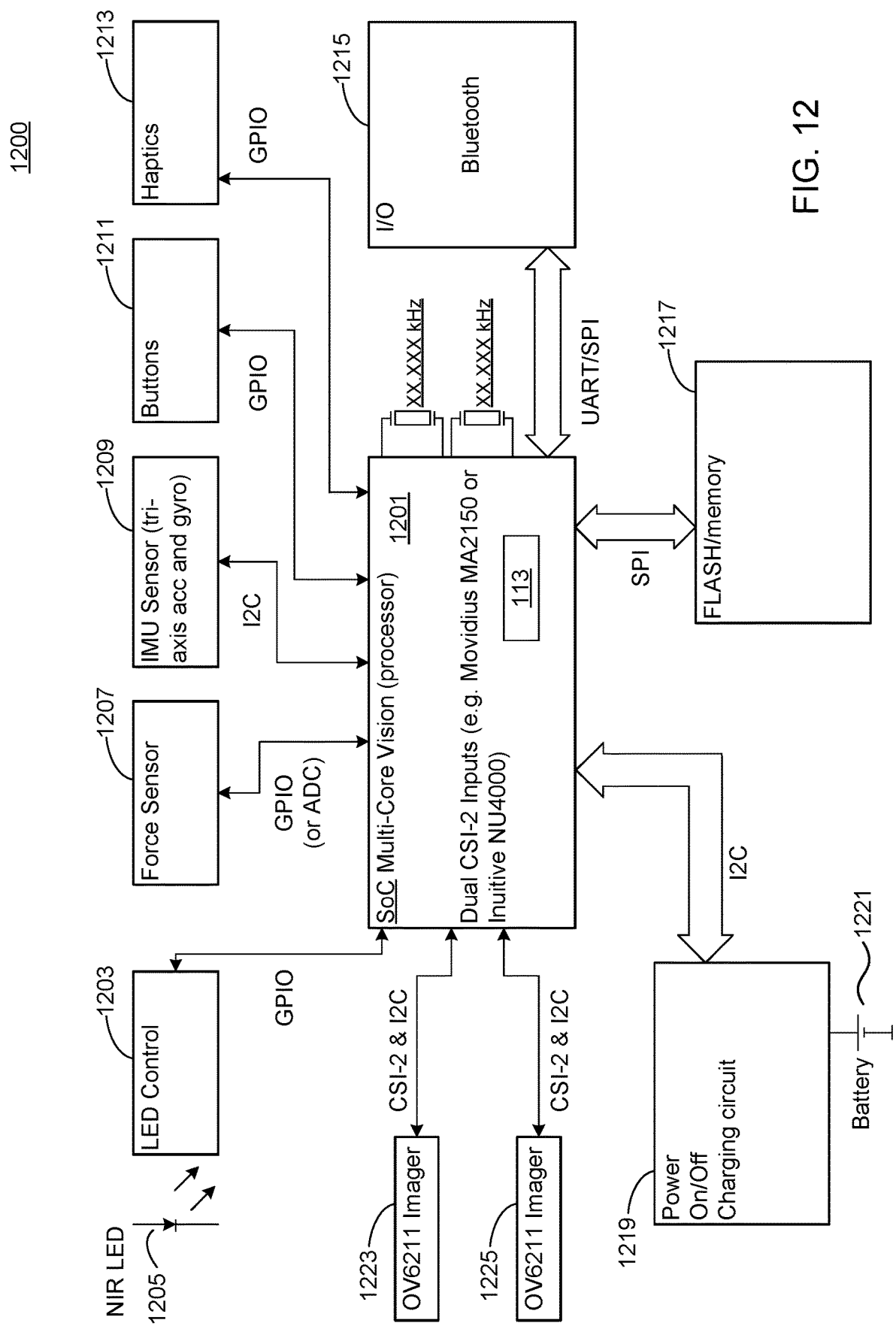
FIG. 12 is a block diagram of an example processor platform capable of executing the instructions of FIGS. 7-11 to implement the EO pen location determiner of FIG. 6.

FIG. 12 is a block diagram of an example processor platform 1200 capable of executing the instructions of FIGS. 7-11 to implement the apparatus of FIG. 6. Referring to FIG. 12, the processor platform includes system-on-chip multi-core vision processor 1201. In some examples, processor 1201 can include EO pen location determiner 113 whose operation is described in detail herein and is not repeated here. In some examples, processor 1201 can include a dual CSI-2 input (e.g., Movidius MA 2150 or Inuitive NU4000) SoC processor. In other examples, other types of processors can be used. Referring to FIG. 12, processor 1201 is coupled to LED control circuitry 1203. In some examples, LED control circuitry controls the operation of LED 1205 such as by controlling the emission of light onto a scribing surface (e.g., 104 in FIG. 1). In some examples, processor 1201 can have input components that can include force sensor 1207, IMU sensor 1209, buttons 1211 and haptics 1213. In addition, processor 1201 can be communicatively coupled to Bluetooth I/O 1215 and flash memory 1217. The power provided to processor 1201 is controlled by power on/off charging circuit 1219 that is coupled to battery 1221. In operation, processor 1201 processes imager control instructions that control the operation of imagers 1223 and 1225 and the image data that is acquired by imagers 1223 and 1225 such as from the scribing surface. In some examples, processor 1201 is a multi-core processor that is designed for three-dimensional data processing. In some examples, the core processors are backed by hardware accelerators for depth, simultaneous localization and mapping (SLAM) and Computer Vision processing which reduces latency.

Figure 13:
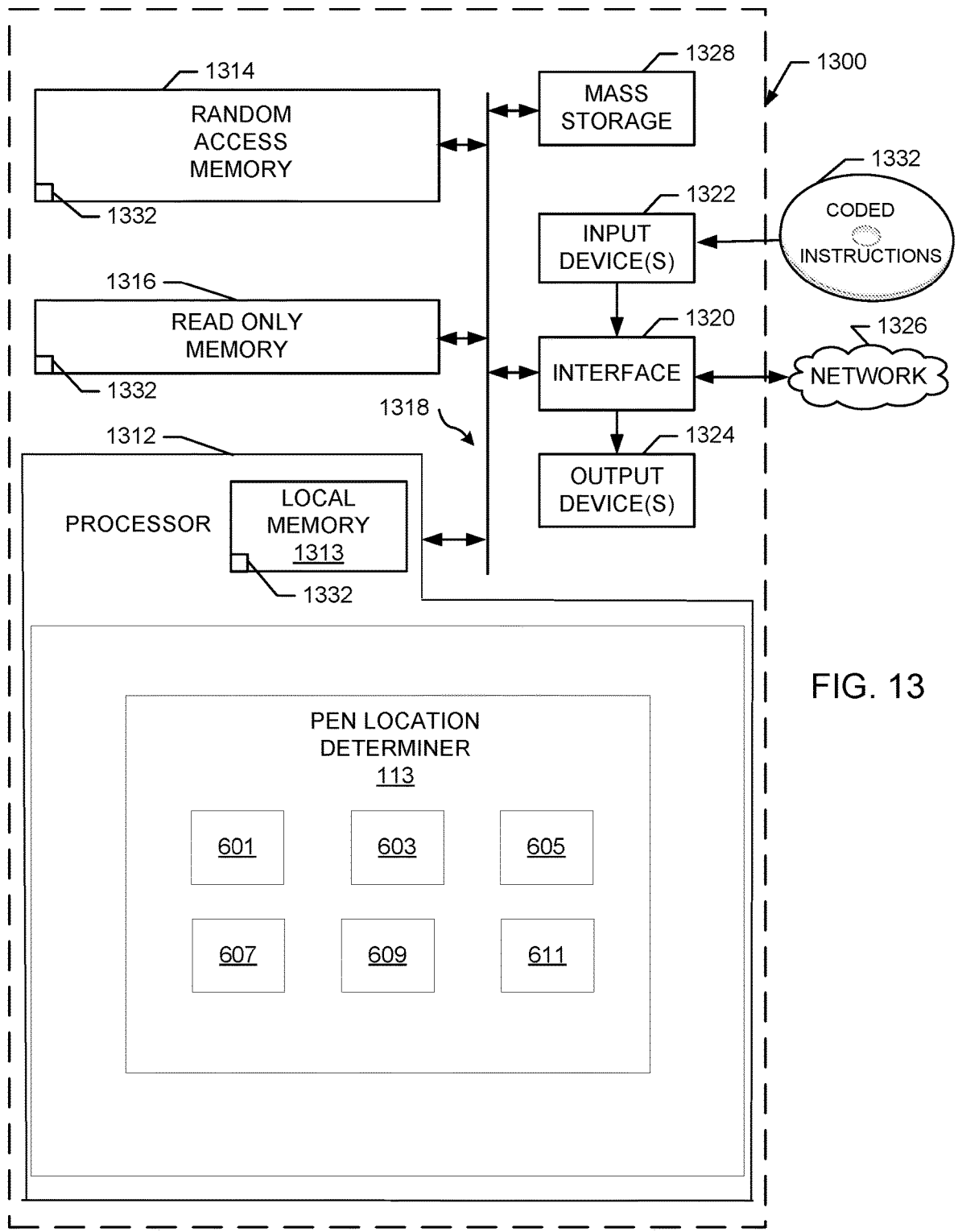
FIG. 13 is a block diagram of an example processor platform capable of executing the instructions of FIGS. 7-11 to implement the EO pen location determiner of FIG. 6.

FIG. 13 is a block diagram of another example processor platform 1300 capable of executing the instructions of FIGS. 7-11 to implement the apparatus of FIG. 6. The processor platform 1300 can be, for example, an EO pen embedded microprocessor, microcontroller, system-on-chip (SoC) or alternatively a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an I2C, wireless Bluetooth, wireless WiFi, Ethernet interface, a universal serial bus (USB), and/or a PCI express interface.

In the illustrated example, input devices 1322 are connected to the interface circuit 1320. The input device(s) 1322 permit(s) a user to enter data and commands into the processor 1312. The input device(s) can be implemented by, for example, an audio sensor, a microphone, a camera (still or video), an accelerometer, an inertial measurement unit, a pen nib pressure sensor, and/or a voice recognition system.

Output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, may include a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.) or non-network connection.

The processor platform 1300 of the illustrated example also includes mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 7-11 may be stored in the mass storage device 1328, in the volatile memory 1314, in the non-volatile memory 1316, and/or on a removable tangible computer readable storage medium such as a CD or DVD.

From the foregoing, it will be appreciated that methods and apparatus have been disclosed which provide for a higher accuracy (position and tilt), greater depth-of-field, and the ability to apply a more highly efficient computational pipe line for decoding EO pen position with varying pen to scribing surface orientation changes. Some examples use stereoscopic imaging that enables a more deterministic and simpler rather than more computationally intensive and stochastic or random process to determine scribing plane to pen orientation. Some examples use embedded logic. Some examples also allow for significantly higher position measurement and data update rates from the EO pen to a host computer (desktop, notebook, tablet, phone, etc.) via an RF channel (e.g., Bluetooth). In some examples, if hardware acceleration via a DSP (ASIC or FPGA) or other computationally accelerated core is utilized improvements in EO pen performance can be significantly increased in comparison to the speed of other solutions due to the described increased computational efficiency.

Some EO pen systems use a much physically larger sized imager (e.g., 25 times larger) and hence require an extended optical path with a fold mirror between the imaging lens and a CMOS imager. Some EO pen systems use imager pixel sizes that are greater than 15 um square. Some example imagers use imager pixels of sizes that are less than 5 um square (e.g., 3×3 um). Some examples use the highly compact CameraCube™ technology available from OmniVision™. Examples described herein include a straightforward design and require uncomplicated optical alignment procedures during manufacture.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a distance determiner to determine a distance of a pen to a scribing surface based on a first image output by a first imager of the pen and a second image output by a second imager of the pen, the first image associated with a first plane of view and the second image associated with a second plane of view;
 a tilt orientation determiner to determine a tilt orientation of the scribing surface relative to the pen;
 a corrector to adjust at least one of the first plane of view or the second plane of view based on the tilt orientation of the scribing surface; and
 a location determiner to determine a location of the pen relative to the scribing surface based on the at least one of the adjusted first plane of view or the adjusted second plane of view.

2. The apparatus of claim 1, wherein the tilt orientation is a three-dimensional orientation of the scribing surface and the distance determiner is to:

determine a first distance of the pen from a first point in the first plane of view of the first image, the first distance corresponding to a first depth of the first point; and determine a second distance of the pen from a second point in the second plane of view of the second image, the second distance corresponding to a second depth of the second point, the tilt orientation determiner to determine the three-dimensional orientation of the scribing surface based on the first distance and the second distance.

3. The apparatus of claim 2, wherein the first plane of view and the second plane of view at least partially overlap to define an overlap region and the first point and the second point are in the overlap region.

4. The apparatus of claim 1, wherein the corrector is to:
determine a first depth of field of the first imager based on the tilt orientation;
determine a second depth of field of the second imager based on the tilt orientation;
perform a comparison of the first depth of field and the second depth of field; and
correct the first plane of view based on the comparison.

5. The apparatus of claim 1, further including a coordinate determiner to determine coordinates of the pen relative to the scribing surface based on the at least one of the adjusted first plane of view or the adjusted second plane of view, the location determiner to determine the location of the pen based on the coordinates.

6. A system comprising:
a stylus including a first imager and a second imager, the first imager to output a first image of a scribing surface from a first perspective and the second imager to output a second image of the scribing surface from a second perspective; and
one or more processors to:
determine a plurality of distance measurements, respective ones of the distance measurements representing a distance of the stylus from the scribing surface at a respective point in the first image or the second image;
determine a tilt orientation of the scribing surface relative to the stylus based on two or more of the plurality of distance measurements;
adjust a plane of view associated with at least one of the first perspective or the second perspective based on the tilt orientation; and
identify a location of the stylus relative to the scribing surface based on coordinate data for the stylus associated with the adjusted plane of view.

7. The system of claim 6, wherein the first imager has a first field of view and the second imager has a second field of view, the first field of view at least partially overlapping the second field of view.

8. The system of claim 6, wherein the one or more processors is to adjust the plane of view associated with the first perspective and generate a first corrected image based on the adjusted plane of view.

9. The system of claim 8, wherein the one or more processors is to determine the coordinate data from the first corrected image.

10. The system of claim 8, wherein the one or more processors is to:
determine a first depth of field associated with the first imager based on the tilt orientation; and
select the plane of view associated with the first perspective for adjustment based on the first depth of field.

11. A non-transitory computer readable storage medium comprising instructions that, when executed, cause at least one machine to at least:
determine a distance of a pen to a display surface based on a first image output by the pen and a second image output by the pen, the first image associated with a first plane of view and the second image associated with a second plane of view;
determine a tilt orientation of the display surface relative to the pen;
adjust at least one of the first plane of view or the second plane of view based on the tilt orientation of the display surface; and
determine a location of the pen relative to the display surface based on the at least one of the adjusted first plane of view or the adjusted second plane of view.

12. The non-transitory computer readable storage medium of claim 11, wherein the instructions, when executed, cause the at least one machine to:
determine a first distance of the pen from a first point in the first plane of view of the first image, the first distance corresponding to a first depth of the first point;
determine a second distance of the pen from a second point in the second plane of view of the second image, the second distance corresponding to a second depth of the second point; and
determine the tilt orientation of the display surface based on the first distance and the second distance, the tilt orientation corresponding to a three-dimensional orientation of the display surface.

13. The non-transitory computer readable storage medium of claim 12, wherein the first plane of view and the second plane of view at least partially overlap to define an overlap region and the first point and the second point are in the overlap region.

14. The non-transitory computer readable storage medium of claim 11, wherein the instructions, when executed, cause the at least one machine to:
determine a first depth of field of the pen based on the tilt orientation;
determine a second depth of field of the pen based on the tilt orientation;
perform a comparison of the first depth of field and the second depth of field; and
correct the first plane of view based on the comparison.

15. The non-transitory computer readable storage medium of claim 11, wherein the instructions, when executed, cause the at least one machine to:
determine coordinates of the pen relative to the display surface based on the at least one of the adjusted first plane of view or the adjusted second plane of view; and
determine the location of the pen based on the coordinates.

16. An apparatus comprising:
memory;
instructions; and
processor circuitry to execute the instructions to:
determine a distance of a pen to a display surface based on a first image output by the pen and a second image output by the pen, the first image associated with a first plane of view and the second image associated with a second plane of view;
determine a tilt orientation of the display surface relative to the pen;
adjust at least one of the first plane of view or the second plane of view based on the tilt orientation of the display surface; and determine a location of the pen relative to the display surface based on the at least one of the adjusted first plane of view or the adjusted second plane of view.

17. The apparatus of claim 16, wherein the processor circuitry is to:
determine a first distance of the pen from a first point in the first plane of view of the first image, the first distance corresponding to a first depth of the first point;
determine a second distance of the pen from a second point in the second plane of view of the second image, the second distance corresponding to a second depth of the second point; and
determine the tilt orientation of the display surface based on the first distance and the second distance, the tilt orientation corresponding to a three-dimensional orientation of the display surface.

18. The apparatus of claim 17, wherein the first plane of view and the second plane of view at least partially overlap to define an overlap region and the first point and the second point are in the overlap region.

19. The apparatus of claim 16, wherein the processor circuitry is to:
determine a first depth of field of the pen based on the tilt orientation;
determine a second depth of field of the pen based on the tilt orientation;
perform a comparison of the first depth of field and the second depth of field; and
correct the first plane of view based on the comparison.

20. The apparatus of claim 16, wherein the processor circuitry is to:
determine coordinates of the pen relative to the display surface based on the at least one of the adjusted first plane of view or the adjusted second plane of view; and
determine the location of the pen based on the coordinates.

* * * * *